US012415603B2

(12) United States Patent
Butterworth

(10) Patent No.: US 12,415,603 B2
(45) Date of Patent: Sep. 16, 2025

(54) APPARATUS FOR MOVING OBJECT RELATIVE TO AIRCRAFT FRAME

(71) Applicant: Benjamin Butterworth, Richmond, VA (US)

(72) Inventor: Benjamin Butterworth, Richmond, VA (US)

( * ) Notice: Subject to any disclaimer, the term of this patent is extended or adjusted under 35 U.S.C. 154(b) by 0 days.

(21) Appl. No.: 18/785,369

(22) Filed: Jul. 26, 2024

(65) Prior Publication Data

US 2024/0383606 A1 Nov. 21, 2024

Related U.S. Application Data

(63) Continuation of application No. PCT/US2023/081269, filed on Nov. 28, 2023.

(60) Provisional application No. 63/385,041, filed on Nov. 28, 2022.

(51) Int. Cl.
*B64D 9/00* (2006.01)
*B64C 17/00* (2006.01)

(52) U.S. Cl.
CPC ............. *B64D 9/00* (2013.01); *B64C 17/00* (2013.01); *B64D 2009/006* (2013.01)

(58) Field of Classification Search
CPC ...... B64D 9/00; B64D 2009/006; B64C 17/00
See application file for complete search history.

(56) References Cited

U.S. PATENT DOCUMENTS

| 9,550,561 | B1* | 1/2017 | Beckman | G05D 3/00 |
| 9,908,618 | B2* | 3/2018 | Vaughn | B64U 40/20 |
| 2014/0339354 | A1 | 11/2014 | Gaillimore et al. | |
| 2016/0159472 | A1* | 6/2016 | Chan | B64U 30/20 244/39 |
| 2018/0354625 | A1* | 12/2018 | Verkade | B64D 9/00 |

OTHER PUBLICATIONS

International Search Report issued in corresponding International Application No. PCT/US2023/081269, on Mar. 13, 2024, 2 pages.
Written Opinion issued in corresponding International Application No. PCT/US2023/081269, on Mar. 13, 2024, 12 pages.

* cited by examiner

*Primary Examiner* — Richard G Davis
(74) *Attorney, Agent, or Firm* — McDonnell Boehnen Hulbert & Berghoff LLP

(57) ABSTRACT

An apparatus includes: a mechanical interface configured to couple an object to a frame of an aircraft; one or more processors; and a computer readable medium storing instructions that, when executed by the one or more processors, cause the apparatus to perform functions that include: detecting a control input provided to an actuator of the aircraft and/or an output of a sensor that indicates a state of the actuator; determining, based on the control input provided to the actuator and/or the output of the sensor, a procedure for moving the object relative to the frame; and using the mechanical interface to perform the procedure.

18 Claims, 7 Drawing Sheets

APPARATUS FOR MOVING OBJECT RELATIVE TO AIRCRAFT FRAME

CROSS-REFERENCE TO RELATED APPLICATIONS

This application is a bypass continuation application of international application No. PCT/US2023/081269, filed on Nov. 28, 2023, which claims priority to U.S. Provisional Patent Application No. 63/385,041, filed Nov. 28, 2022, the contents of both of which are hereby incorporated by reference.

FIELD OF THE DISCLOSURE

The present disclosure relates to an apparatus for moving an object relative to a frame of an aircraft. In particular, the disclosure relates to an apparatus that moves an object relative to a frame of an aircraft based on a control input provided to an actuator of the aircraft and/or an output of a sensor that indicates a state of the aircraft.

BACKGROUND

Objects such as cargo or components of an aircraft can cause the aircraft to become unbalanced and difficult to control during flight. For example, a cargo container that is attached to the aircraft could be loaded in an unbalanced fashion prior to takeoff of the aircraft. In other examples, the cargo might shift during flight to create the unbalanced condition. In some cases, the unbalanced state of the aircraft could undesirably be severe enough to require jettison of the cargo.

SUMMARY

A first example is an apparatus comprising: a mechanical interface configured to couple an object to a frame of an aircraft; one or more processors; and a computer readable medium storing instructions that, when executed by the one or more processors, cause the apparatus to perform functions comprising: detecting a control input provided to an actuator of the aircraft and/or an output of a sensor that indicates a state of the actuator; determining, based on the control input provided to the actuator and/or the output of the sensor, a procedure for moving the object relative to the frame; and using the mechanical interface to perform the procedure.

A second example is a non-transitory computer readable medium storing instructions that, when executed by one or more processors of an apparatus, cause the apparatus to perform functions comprising: detecting a control input provided to an actuator of an aircraft and/or an output of a sensor that indicates a state of the actuator; determining, based on the control input provided to the actuator and/or the output of the sensor, a procedure for moving an object relative to a frame of the aircraft; and using a mechanical interface to perform the procedure.

A third example is method comprising: detecting a control input provided to an actuator of an aircraft and/or an output of a sensor that indicates a state of the actuator; determining, based on the control input provided to the actuator and/or the output of the sensor, a procedure for moving an object relative to a frame of the aircraft; and using a mechanical interface to perform the procedure.

BRIEF DESCRIPTION OF THE DRAWINGS

The above, as well as additional, features will be better understood through the following illustrative and non-limiting detailed description of example embodiments, with reference to the appended drawings.

Figure 1:
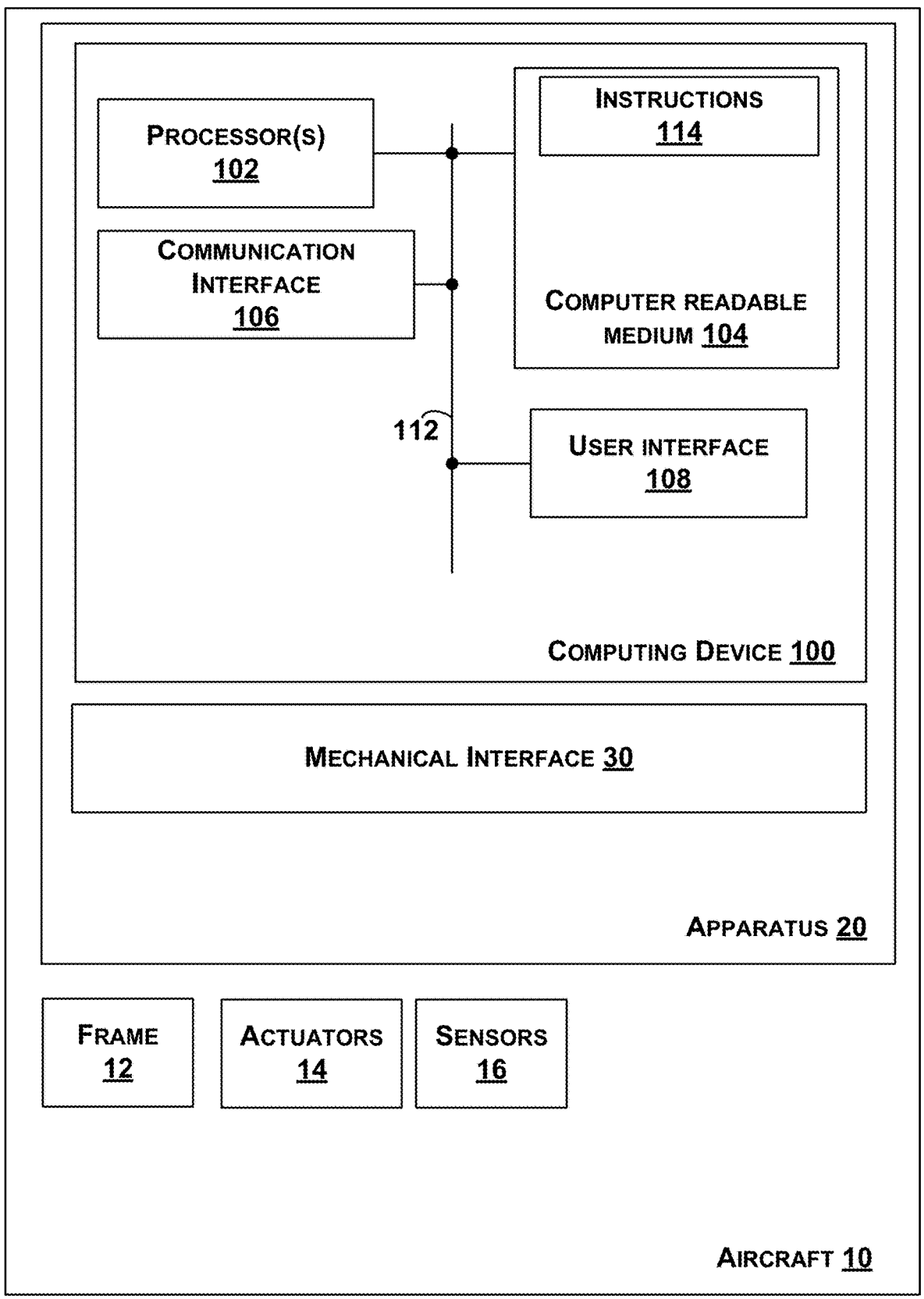
FIG. 1 is a block diagram of an aircraft, according to an example.

All the figures are schematic, not necessarily to scale, and generally only show parts which are necessary to elucidate example embodiments, wherein other parts may be omitted or merely suggested.

DETAILED DESCRIPTION

Generally, components of an aircraft and any cargo within or attached externally to the aircraft contribute to a location of a net center of gravity of a complex that includes the aircraft and the cargo. That location, as well as a magnitude of the total weight of the aircraft and the cargo, affects how the aircraft moves in response to control inputs being provided to one or more actuators of the aircraft. Such actuators include rotor blades, turbofans, turbines, ducted fans, rudders, elevators or any thrust generators or control surfaces configured to control movement of the aircraft during flight. In some cases, the net center of gravity being significantly displaced (e.g., horizontally) from a nominal center of the frame can create a need for one actuator to produce much more torque than the other actuators or for one or more of the actuators to reach their limit with respect to torque output or position. To help address this issue, this disclosure includes apparatuses and methods for mitigating such an unbalanced condition of the aircraft.

For example, an apparatus includes a mechanical interface configured to couple an object (e.g., a cargo container, a payload within the aircraft or tethered to an underside of the aircraft, etc.) to a frame of an aircraft, one or more processors, and a computer readable medium storing instructions that, when executed by the one or more processors, cause the apparatus to perform functions. The functions include detecting a control input provided to an actuator of the aircraft and/or an output of a sensor that indicates a state of the actuator. The functions further include determining, based on the control input provided to the actuator and/or the output of the sensor, a procedure for moving the object relative to the frame, and using the mechanical interface to perform the procedure.

That is, the apparatus can monitor the states and/or the control inputs provided to the one or more actuators (e.g., by another computing device). Large torque output imbalances between actuators, especially while hovering, can indicate that the net center of gravity is not centered between the actuators. Additionally, detecting control inputs representing a particular aerial maneuver can indicate that moving the net center of gravity will be helpful in performing the aerial maneuver. Thus, the apparatus can reactively move the object with respect to the frame to help balance the object and the aircraft, or the apparatus can anticipate an aerial maneuver and move the object with respect to the frame to facilitate performance of the aerial maneuver.

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

FIG. 1 is a block diagram of an aircraft 10. The aircraft 10 includes a frame 12, actuators 14, sensors 16, and an apparatus 20. In various examples, the aircraft 10 is an airplane, a helicopter, an airship, an unmanned aerial vehicle, a vertical take-off and landing (VTOL) craft, or a drone such as a quadcopter.

The frame 12 is a structure to which various components of the aircraft 10 can be attached. The frame 12 can be formed of carbon fiber composite, plastic, or aluminum, for example. The frame 12 can take the form of an x-frame, but other examples are possible.

The actuators 14 include one or more thrusters, propellers, rotors, jet engines, or control surfaces that are configured to cause the aircraft 10 to move or change direction or orientation. In some embodiments, the actuators 14 include components that facilitate movement, including gearboxes that each drive propellers and/or propeller motors. The actuators 14 may also include multiple lift rotors that facilitate vertical takeoff and landing of the aircraft 10. Each lift rotor can be driven by a gearbox, which in turn can be driven by an electric motor. In some examples, the actuators 14 include one or more rotor blades, turbofans, turbines, ducted fans, rudders, or elevators.

The sensors 16 include one or more of a position sensor, a temperature sensor, a torque sensor, or a tachometer. Other examples are possible The one or more sensors 16 are operably coupled to the actuators 14 such that the sensors 16 are each configured to generate a signal representing a state of one or more of the actuators 14.

The apparatus 20 includes a computing device 100 and a mechanical interface 30.

The computing device 100 includes one or more processors 102, a non-transitory computer readable medium 104, a communication interface 106, and a user interface 108. Components of the computing device 100 can be linked together by a system bus, network, or other connection mechanism 112.

The one or more processors 102 can be any type of processor(s), such as a microprocessor, a field programmable gate array, a digital signal processor, a multicore processor, etc., coupled to the non-transitory computer readable medium 104.

The non-transitory computer readable medium 104 can be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the non-transitory computer readable medium 104 may store instructions 114. The instructions 114 can be executable by the one or more processors 102 to cause the computing device 100 to perform any of the functions or methods described herein.

The communication interface 106 includes hardware to enable communication within the computing device 100 and/or between the computing device 100 and one or more other devices. The hardware can include any type of input and/or output interfaces, a universal serial bus (USB), PCI Express, transmitters, receivers, and antennas, for example. The communication interface 106 can be configured to facilitate communication with one or more other devices, in accordance with one or more wired or wireless communication protocols. For example, the communication interface 106 can be configured to facilitate wireless data communication for the computing device 100 according to one or more wireless communication standards, such as one or more Institute of Electrical and Electronics Engineers (IEEE) 801.11 standards, ZigBee standards, Bluetooth standards, etc. As another example, the communication interface 106 can be configured to facilitate wired data communication with one or more other devices. The communication interface 106 may also include analog-to-digital converters (ADCs) or digital-to-analog converters (DACs) that the computing device 100 can use to control various components of the computing device 100 or external devices.

The user interface 108 includes any type of display component configured to display data. As one example, the user interface 108 can include a touchscreen display. As another example, the user interface 108 can include a flat-panel display, such as a liquid-crystal display (LCD) or a light-emitting diode (LED) display. The user interface 108 includes one or more pieces of hardware used to provide data and control signals to the computing device 100. For instance, the user interface 108 can include a mouse or a pointing device, a keyboard or a keypad, a microphone, a touchpad, or a touchscreen, among other possible types of user input devices. Generally, the user interface 108 may enable an operator to interact with a graphical user interface (GUI) provided by the computing device 100 (e.g., displayed by the user interface 108).

The mechanical interface 30 can take the form of any mechanical or electromechanical system that is configured to move an object, such as an externally mounted payload of the aircraft 10, in at least two orthogonal directions (e.g., forward/aft and port/starboard) relative to the frame 12. The mechanical interface 30 is generally mounted to an underside of the aircraft 10, but could also be mounted on a top side of the aircraft 10 or within the aircraft 10. Other examples are possible. The mechanical interface 30 generally includes a hard point attachment for coupling the object to the mechanical interface 30. The mechanical interface 30 is discussed in more detail below.

Figure 2:
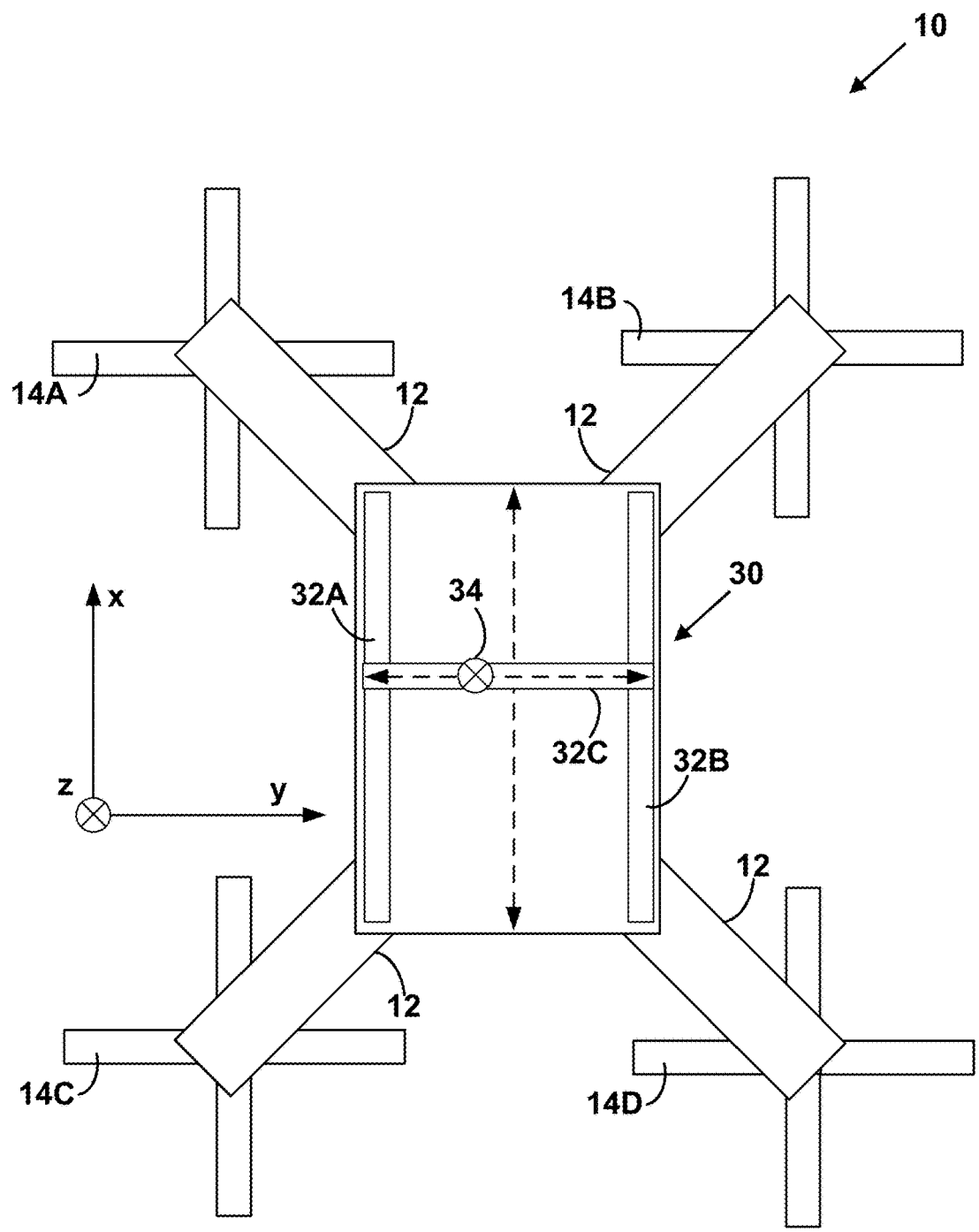
FIG. 2 is a schematic diagram of an aircraft, according to an example.

FIG. 2 is a schematic diagram of an underside of the aircraft 10. In FIG. 2, the aircraft 10 takes the form of a quadcopter, but other examples are possible. The frame 12 takes the form of an x-frame, but many other frame configurations are possible. The actuator 14A, the actuator 14B, the actuator 14C, and the actuator 14D (e.g., rotors or propellers) are coupled to respective distal ends of the frame 12. In some examples, the actuators are embedded within the frame. The mechanical interface 30 is coupled to an underside of the frame 12. In some examples, the mechanical interface 30 is coupled to a fuselage, a passenger compartment, or other parts of the aircraft 10.

The mechanical interface 30 can take various forms. In FIG. 2, the mechanical interface 30 includes a guide 32A, a guide 32B, and a guide 32C that are configured to facilitate movement of an attachment point 34 in two orthogonal directions (e.g., the x-axis and the y-axis). The guide 32A, the guide 32B, and the guide 32C can take the form of rails. Motors, gearboxes, drive screws, and/or similar components can be used to move the guide 32C, and thus the attachment point 34 that is attached to the guide 32C, parallel to the x-axis. Similar components can be used to move the attachment point 34 back and forth along the y-axis. As shown, the guide 32A spans parallel to the guide 32B and parallel to the x-axis. The guide 32C spans perpendicular to the guides 32A-B and parallel to the y-axis. That is, the guide 32C is coupled to the guide 32A and the guide 32B such that the guide 32C can move in the x-direction. The attachment point 34 is coupled to the guide 32C such that the attachment point 34 can move in the y-direction.

In operation, the computing device 100 detects one or more control inputs provided to one or more of the actuators 14A-D. In various examples, the control inputs are electrical signals representing commands to change a thrust provided by an actuator, to change a blade pitch of an actuator, or to change a position of an actuator. For example, the computing device 100 is configured, via a wired or wireless connection to the actuators 14A-D or to user input devices that control the actuators 14A-D, to sample or monitor the control signals that are provided to the actuators 14A-D. Such user input devices can include levers, control sticks, pedals, or knobs. In other examples, the computing device 100 generates the control signals.

Additionally or alternatively, the computing device 100 detects outputs of one or more sensors 16 that indicate states of one or more of the actuators 14A-D. In various examples, the outputs are analog or digital signals representing a metric that quantifies a state of an actuator 14. For example, the sensors 16 can include one or more position sensors, one or more temperature sensors, one or more torque sensors, and/or one or more tachometers. Thus, the outputs can be signals representing positions (e.g., rudder deflection or blade pitch) of one or more of the actuators 14A-D, temperatures of one or more of the actuators 14A-D, torque output of one or more of the actuators 14A-D, and angular velocity of one or more of the actuators 14A-D.

Next, the computing device 100 determines (e.g., selects or calculates) a procedure for moving an object relative to the frame 12 based on the control input provided to one or more of the actuators 14A-D and/or the output of the sensors 16. In FIG. 2, the object is not shown for purposes of clarity, but the object can take the form of (a) a battery configured to provide power to the aircraft 10, (b) a cargo container, (c) the one or more processors 102, (d) the computer readable medium 104, (e) a camera, and/or (f) a container of fluid. The object is mounted to the attachment point 34 and hangs therefrom below the aircraft 10. The object can be positioned differently in other examples. After the computing device 100 determines the procedure, the computing device 100 sends control signals to the mechanical interface 30 such that the procedure is executed and the object and the attachment point 34 are moved relative to the frame 12.

As noted above, the computing device 100 can determine the procedure based on the outputs of the one or more sensors 16. In some examples, the computing device 100 determines that outputs of the one or more sensors 16 satisfy a condition. In these circumstances, the computing device 100 determines the procedure based on and in response to determining that the outputs of the one or more sensors 16 satisfy the condition. The conditions discussed below can generally be caused by an unbalanced payload.

In some examples, the condition detected by a sensor 16 is related to temperatures of one or more of the actuators 14. For example, the computing device 100 determines that a temperature of one or more of the actuators 14 exceeds a threshold temperature (e.g., 270 C or 90% of a rated maximum temperature of the actuator). More specifically, the computing device 100 determines that a temperature of the actuator 14A exceeds the threshold temperature and responsively operates the mechanical interface 30 to move the attachment point 34 and/or the object away from the actuator 14A and/or toward the actuator 14B, the actuator 14C, or the actuator 14D. In various examples, a temperature of an actuator can generally include any temperature detected on or near any component of the actuator that is related to the current state of the actuator. For example, the temperature of an actuator could be the temperature of the coolant being used to cool the actuator after absorbing heat from the actuator, the temperature of an engine block driving the actuator, or the temperature of coils of wire of an electric motor driving the actuator.

In some examples, the condition detected by a sensor 16 is related to angular velocities (e.g., revolutions per minute) of one or more of the actuators 14. For example, the computing device 100 determines that an angular velocity of one or more of the actuators 14 exceeds a threshold angular velocity (e.g., 90% of a rated maximum angular velocity of the actuator). More specifically, the computing device 100 determines that an angular velocity of the actuator 14A exceeds the threshold angular velocity and responsively operates the mechanical interface 30 to move the attachment point 34 and/or the object away from the actuator 14A and toward the actuator 14B, the actuator 14C, and/or the actuator 14D. In some examples, the angular velocity can be expressed as revolutions per minute for a rotor shaft.

In some examples, the condition detected by a sensor 16 is related to torque output of one or more of the actuators 14. For example, the computing device 100 determines that a torque output of one or more of the actuators 14 exceeds a threshold torque output (e.g., 90% of a rated maximum torque output of the actuator). More specifically, the computing device 100 determines that a torque output of the actuator 14A exceeds the threshold torque output and responsively operates the mechanical interface 30 to move the attachment point 34 and/or the object away from the actuator 14A and toward the actuator 14B, the actuator 14C, and/or the actuator 14D. In some examples, the torque output can be expressed as a torque being applied to a rotor shaft by an engine or a motor.

In some examples, the condition detected by a sensor 16 is related to a position of one or more of the actuators 14 (e.g., rudders or elevators). For example, the computing device 100 determines that a position of one or more of the actuators 14 exceeds a threshold position. For instance, the threshold position could be 90% of a maximum angle that can be made by an actuator and a reference surface of the aircraft.

In some examples, the condition detected by a sensor 16 is related to an orientation of one or more of the actuators 14 (e.g., rotor blade pitch). For example, the computing device 100 determines that an orientation of one or more of the actuators 14 exceeds a threshold orientation. For instance, the threshold orientation could be 90% of a maximum angle that can be made by an actuator and the x-y plane.

In some examples, the condition detected by the sensors 16 is related to a difference between outputs of sensors 16 corresponding to different actuators 14. For instance, the computing device 100 determines that a difference between (i) the output associated with the actuator 14A and (ii) the output associated with the actuator 14B, the actuator 14C, or the actuator 14D exceeds a threshold.

For example, the computing device 100 determines that an angular velocity of the actuator 14A exceeds an angular velocity of the actuator 14B by more than the threshold and responsively operates the mechanical interface 30 to move the attachment point 34 and/or the object away from the actuator 14A and toward the actuator 14B.

In some examples, the computing device 100 determines that a temperature of the actuator 14A exceeds a temperature of the actuator 14B by more than the threshold and responsively operates the mechanical interface 30 to move the attachment point 34 and/or the object away from the actuator 14A and toward the actuator 14B.

For instance, the computing device 100 determines that a torque output of the actuator 14A exceeds a torque output of the actuator 14B by more than the threshold and responsively operates the mechanical interface 30 to move the attachment point 34 and/or the object away from the actuator 14A and toward the actuator 14B.

In some examples, the computing device 100 determines that a position of the actuator 14A exceeds a position of the actuator 14B by more than the threshold and responsively operates the mechanical interface 30 to move the attachment point 34 and/or the object away from the actuator 14A and toward the actuator 14B.

As noted above, the computing device 100 can also use the control inputs provided to one or more of the actuators 14A-D as a basis for determining the procedure for moving the attachment point 34 and/or the object relative to the frame 12. For example, the computing device 100 detects control inputs representing a command for the aircraft to rotate about the y-axis such that the actuator 14A and the actuator 14B are lowered (e.g. moved in the negative z-direction), the actuator 14C and the actuator 14D are raised (e.g. moved in the positive z-direction), and the aircraft 10 moves in the positive x-direction. In this context, the computing device 100 responsively operates the mechanical interface 30 to move the attachment point 34 and the object in the negative x-direction so that a torque produced by a drag force on the object is reduced.

In some examples, the computing device 100 detects control inputs representing a command that if executed would cause the actuator 14A to exceed a threshold condition, such as a threshold orientation, a threshold position, a threshold temperature, a threshold torque output, or a threshold angular velocity. In this context, the computing device 100 responsively operates the mechanical interface 30 to move the attachment point 34 and/or the object such that the procedure includes moving the attachment point 34 and/or the object away from the actuator 14A and/or toward the actuator 14B, the actuator 14C, or the actuator 14D.

Figure 3:
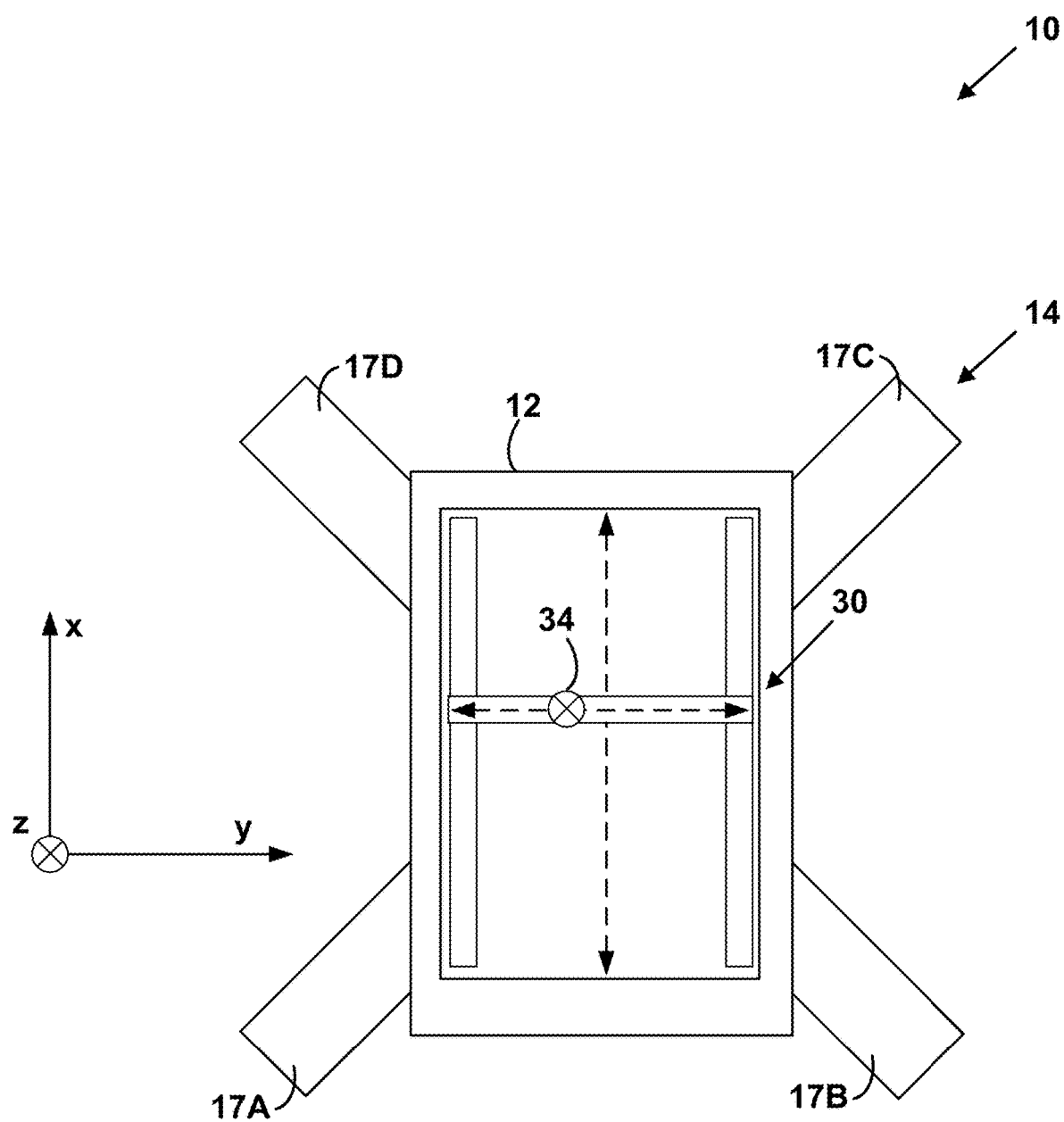
FIG. 3 is a schematic diagram of an aircraft, according to an example.

FIG. 3 is a schematic diagram of an underside of another example of the aircraft 10. In FIG. 3, the aircraft 10 takes the form of a single rotor helicopter, but other examples are possible. Any of the structures or functionality described above (e.g., with reference to FIGS. 1 and 2) related to the aircraft 10 also apply to the aircraft 10 shown in FIG. 3 unless context clearly dictates otherwise.

In operation, the computing device 100 detects control inputs provided to the actuator 14 and/or detects outputs of one or more sensors 16 that indicate a state of the actuator 14. In FIG. 3, the actuator 14 includes a rotor blade 17A, a rotor blade 17B, a rotor blade 17C, and a rotor blade 17D. The rotor blades 17A-D are attached to a spinning rotor shaft that cause the rotor blades 17A-D to rotate as a whole substantially parallel to the x-y plane. The rotor blades 17A-D are each capable of pitching such that a pitch angle between (i) a central axis or another reference plane of the rotor blade and (ii) the x-y plane is variable. This pitch angle of each rotor blade can be varied periodically during a rotation cycle of the actuator 14 such that the aircraft 10 experiences a net torque about the x-axis or about the y-axis.

In some situations, the computing device 100 detects a control input in the form of a command for the rotor blades 17A-D to pitch periodically such that the aircraft 10 experiences a positive torque about the x-axis. Additionally or alternatively, the sensors 16 indicate that the rotor blades 17A-D are pitching such that the aircraft 10 experiences a positive torque about the x-axis. Accordingly, the computing device 100 operates the mechanical interface 30 such that the attachment point 34 and/or the object are moved in the negative y-direction.

In some situations, the computing device 100 detects a control input in the form of a command for the rotor blades 17A-D to pitch periodically such that the aircraft 10 experiences a negative torque about the x-axis. Additionally or alternatively, the sensors 16 indicate that the rotor blades 17A-D are pitching such that the aircraft 10 experiences a negative torque about the x-axis. Accordingly, the computing device 100 operates the mechanical interface 30 such that the attachment point 34 and/or the object are moved in the positive y-direction.

In some situations, the computing device 100 detects a control input in the form of a command for the rotor blades 17A-D to pitch periodically such that the aircraft 10 experiences a negative torque about the y-axis. Additionally or alternatively, the sensors 16 indicate that the rotor blades 17A-D are pitching such that the aircraft 10 experiences a negative torque about the y-axis. Accordingly, the computing device 100 operates the mechanical interface 30 such that the attachment point 34 and/or the object are moved in the negative x-direction.

In some situations, the computing device 100 detects a control input in the form of a command for the rotor blades 17A-D to pitch periodically such that the aircraft 10 experiences a positive torque about the y-axis. Additionally or alternatively, the sensors 16 indicate that the rotor blades 17A-D are pitching such that the aircraft 10 experiences a positive torque about the y-axis. Accordingly, the computing device 100 operates the mechanical interface 30 such that the attachment point 34 and/or the object are moved in the positive x-direction.

Figure 4:
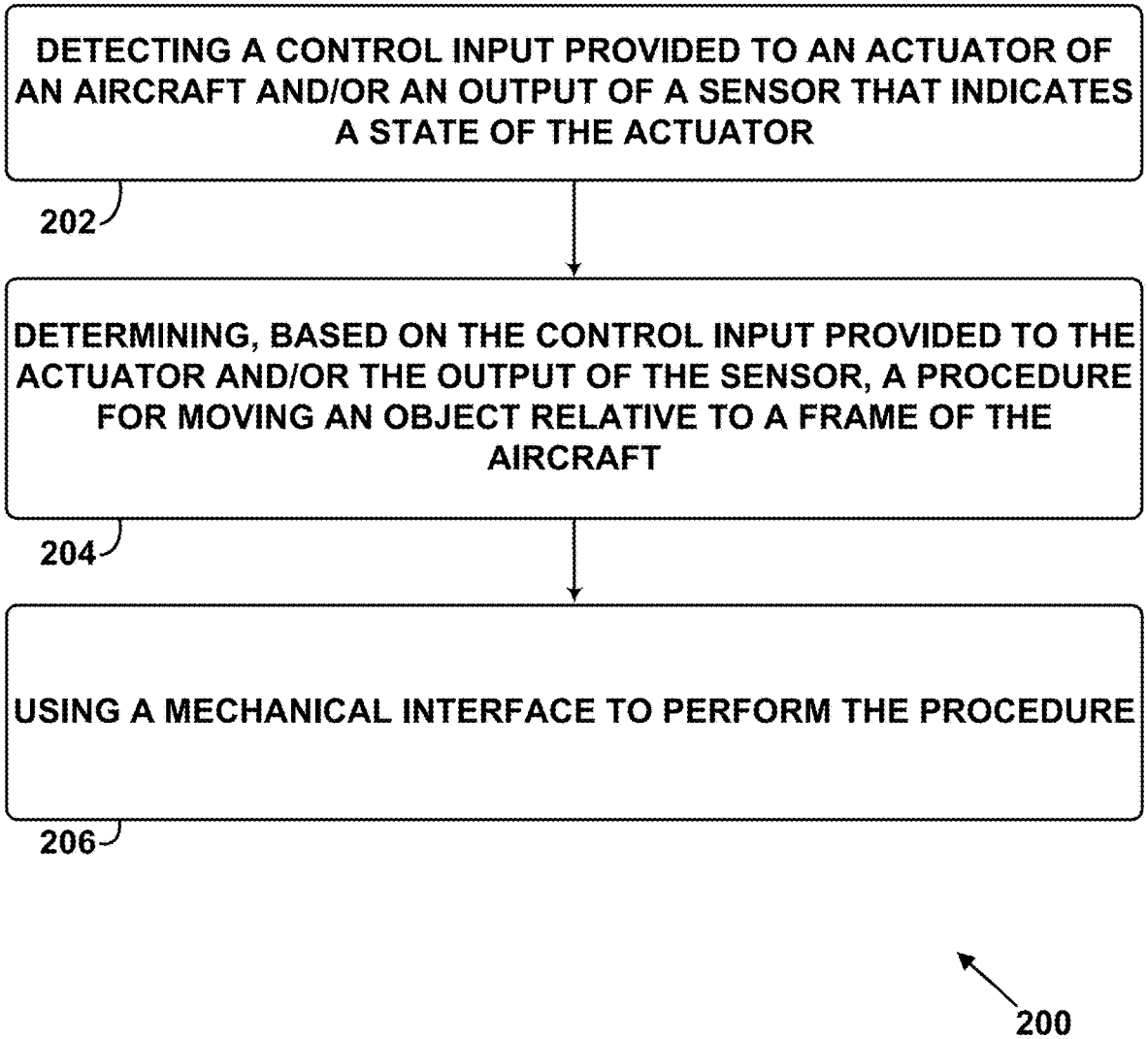
FIG. 4 is a block diagram of a method, according to an example.

FIG. 4 is a block diagram of a method 200. The method 200 can be performed by the apparatus 20 of the aircraft 10. As shown in FIG. 4, the method 200 includes one or more operations, functions, or actions as illustrated by steps 202, 204, and 206. Although the steps are illustrated in a sequential order, these steps may also be performed in parallel, and/or in a different order than those described herein. Also, the various steps can be combined into fewer steps, divided into additional steps, and/or removed based upon the desired implementation.

At step 202, the method 200 includes the computing device 100 detecting one or more control inputs provided to one or more of the actuators 14 of the aircraft and/or one or more outputs of one or more sensors 16 that indicate a state of the one or more actuators 14. Functionality related to step 202 is described above with reference to FIGS. 2 and 3.

At step 204, the method 200 includes the computing device 100 determining, based on the control input provided to the one or more actuators 14 and/or the outputs of the one or more sensors 16, a procedure for moving an object relative to the frame 12 of the aircraft 10. Functionality related to step 204 is described above with reference to FIGS. 2 and 3.

At step 206, the method 200 includes the computing device 100 using the mechanical interface 30 to perform the procedure. Functionality related to step 206 is described above with reference to FIGS. 2 and 3.

FURTHER EXAMPLES

This disclosure relates to a method and system for the control of an airborne aircraft's center of gravity (CG). Particularly, this disclosure relates to the dynamic adjustment of the CG in real time. More particularly, the disclosure relates to a method and system to dynamically adjust the CG via a mechanical interface in response to input signals to achieve or maintain a desired flight attitude, power demand distribution, or in response to emergency system failure. Specifically, this disclosure relates to a technique to align or skew an aircraft's CG with that of an undermounted cargo container where the payloads CG may be unknown or in an undesired position causing demand imbalances to engines and rotors.

Some methods of controlling an aircraft's center of gravity involve the precise distribution of cargo weight within an internal cargo hold to ensure the CG of the aircraft with cargo remains within acceptable parameters. This requires careful weighting of each piece of cargo and its deliberate securing in place within the cargo hold to ensure the aircraft remains in a controllable balance. The purpose is to ensure the flight control systems remain functional and that the aircraft can operate with full authority over its attitude and direction. If not done correctly, or if the cargo shifts, the aircraft can suddenly find itself out of CG limit upon liftoff or while in flight and cause the aircraft to crash.

Alternatively, cargo helicopters and drones can externally mount cargo for transport. This involves suspending the cargo from a cable to a hardpoint directly under the aircraft's CG to ensure the cargo's CG is directly centered on the aircraft's CG and enable the aircraft to continue having full flight control authority. This method carries significant risks because the cargo is exposed to the airstream while the helicopter is in flight. The sling load will begin to oscillate and spin uncontrollably and must be mitigated using drogue chutes and expert piloting. Lastly, cargo can be hard mounted underneath an aircraft. This is rarely used as there are only a few examples of helicopters designed to accommodate a hard mounted cargo container affixed to the bottom of the aircraft with the priority being aerodynamic performance.

Regardless of method used, a dangerous emergency condition exists if the combined CG exceeds the safe operating limits of the aircraft. The aircraft's attitude will begin to drift out of the desired state because the flight control authority required to maintain it will be more than is available. The unrecoverable condition requires the jettison of the cargo to save the aircraft.

The method and system of this disclosure involves the ability to shift the relative positions of the aircraft and an undermounted payload such as to dynamically control the combined center of gravity to achieve the desired flight control characteristics. The system is related to a mechanical interface that moves a payload hard mounted to the underside of the aircraft in relation to the aircraft's center of gravity. When perfectly center-balanced, the payload CG would be positioned directly underneath the aircraft's CG and therefore maintain maximum flight control authority while simultaneously eliminating the risks associated with a sling-loaded payload (i.e., oscillation and spinning). Accelerometers, gyroscopes, and other relevant sensors collect information related to aircraft attitude, airspeed, payload position, and load demand placed upon the lift and power generating systems. The information collected from these sensors are sent to a central processing unit to monitor the measured flight characteristics versus the desired conditions. When necessary, the Central Processing Unit then sends command signals to the interface drive system to engage the mechanical interface and shift the undermounted payload's position relative to the aircraft. The Central Processing Unit relies upon real-time input signals to determine when the desired positioning has been reached and then locks the mechanical interface in place until further adjustment is required. Real time dynamic adjustment of the combined centers of gravity and relative positions may be leveraged to balance load demands, achieve desired flight characteristics, or in response to engine/rotor failure, etc.

For aircraft that utilize multiple lift generators, such as tandem rotor helicopters or unmanned quadcopters, dynamically shifting the center of gravity offers the ability to control the load demand placed upon each lift generation system. In the case of a tandem rotor aircraft, shifting the payload forward or aft permits the loading or unloading of either of the rotor systems to achieve a desired balance between the two. This offers additional safety interventions that are not presently available with currently available cargo transportation methods. With multi-rotor aircraft, such as quadcopters, a rotor system failure creates asymmetric lift and power availability. In such situations, the dynamic control of the combined center of gravity grants the possibility of unloading the overburdened rotor systems to balance the load between the remaining lift and power sources and maximize controllability and available power. This further reduces the need for additional rotor redundancy and increases overall safety.

A clear understanding of the key features of the disclosure summarized above may be had by reference to the appended drawings, which illustrate the method and system of the disclosure, although it will be understood that such drawings depict embodiments of the disclosure and, therefore, are not to be considered as limiting its scope regarding other embodiments which the disclosure is capable of contemplating.

Figure 5:
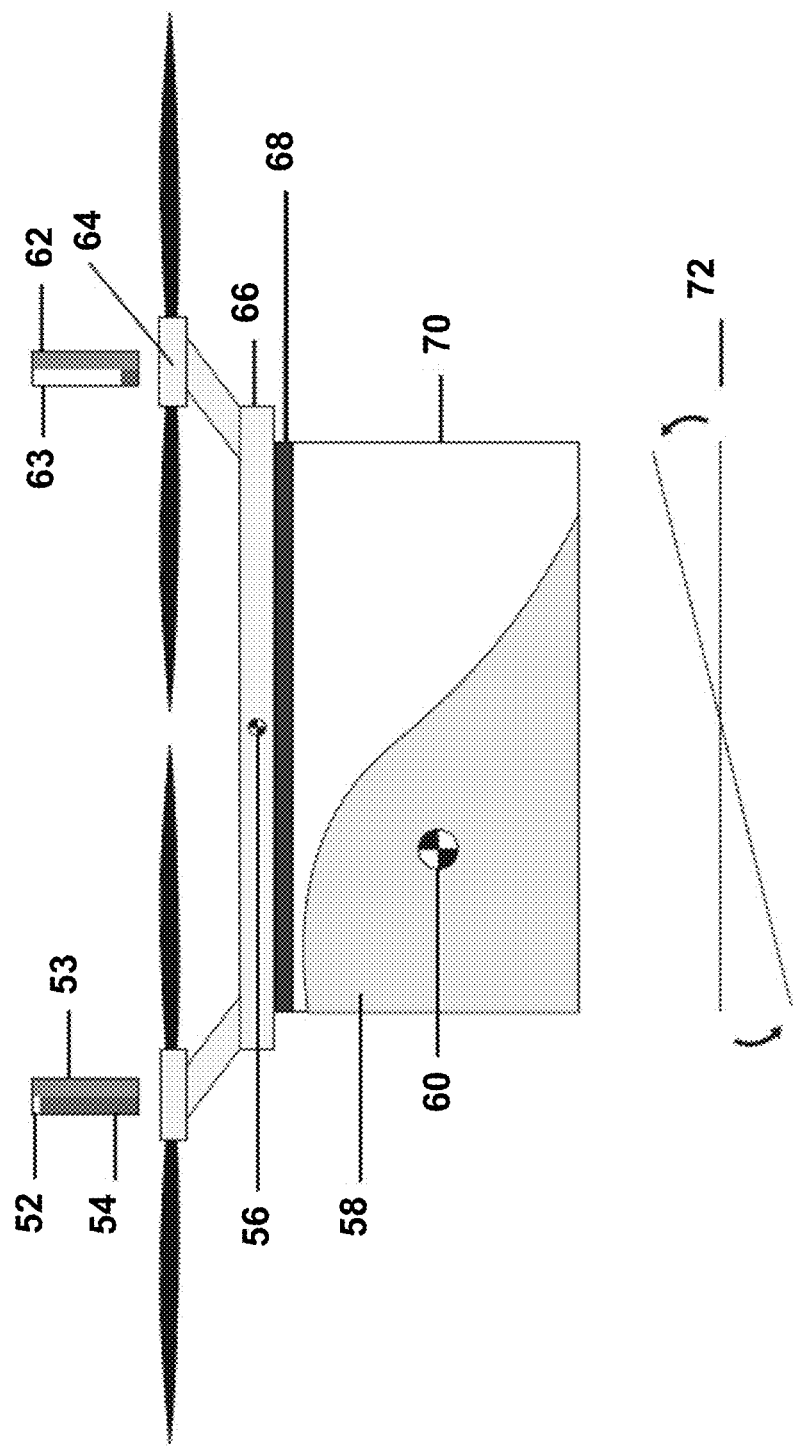
FIG. 5 is a schematic diagram of an aircraft and a payload, according to an example.

FIG. 5 is an illustration of the method and system of this disclosure showing the conditions present during a misalignment between a quad-copter's center of gravity and a hardmounted payload underneath using the disclosure's mechanical interface and control present.

Figure 6:
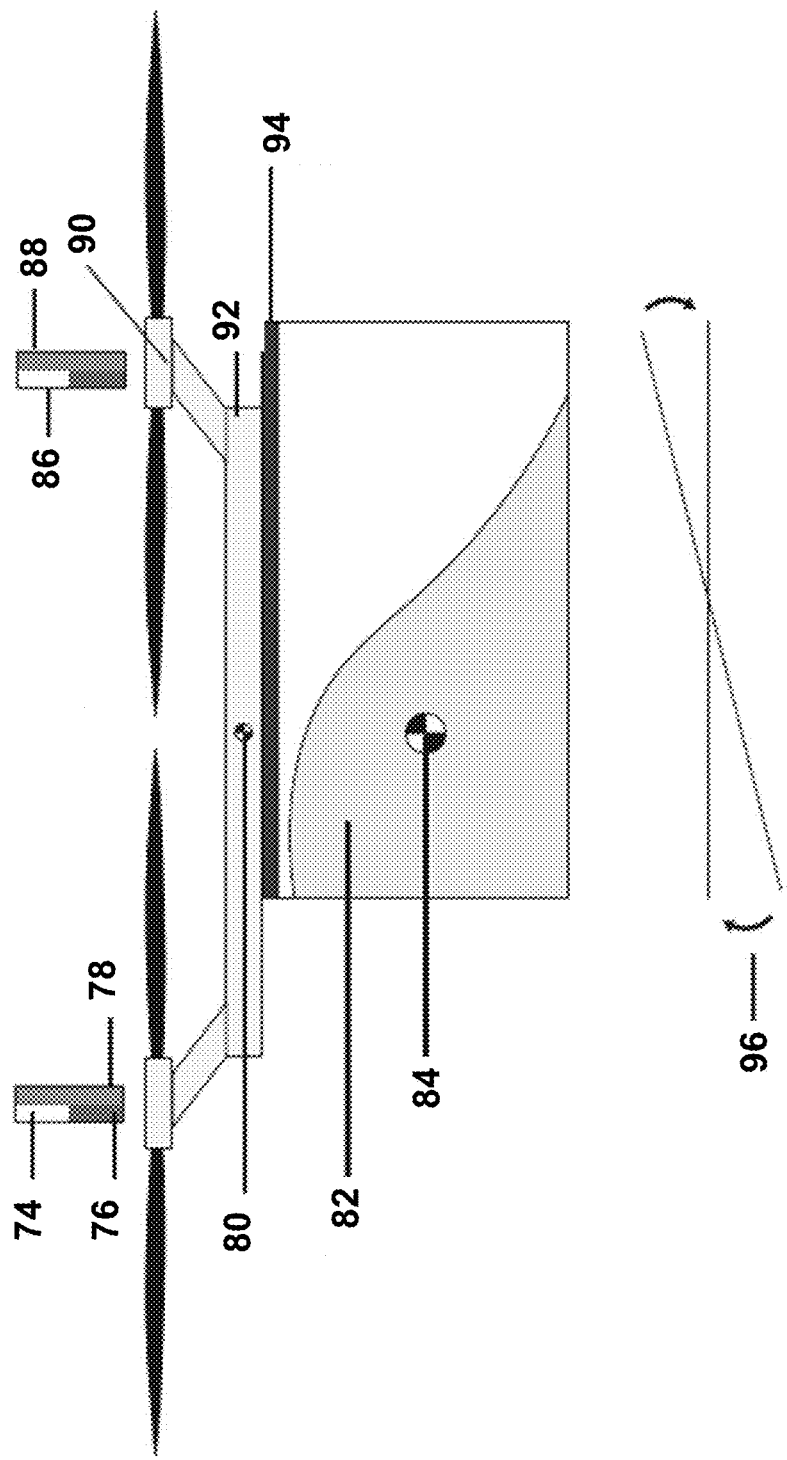
FIG. 6 is a schematic diagram of an aircraft and a payload, according to an example.

FIG. 6 is an illustration of the method and system of this disclosure showing the conditions present during proper alignment between a quad-copter's center of gravity and a hardmounted payload underneath using the disclosure's mechanical interface and control.

Figure 7:
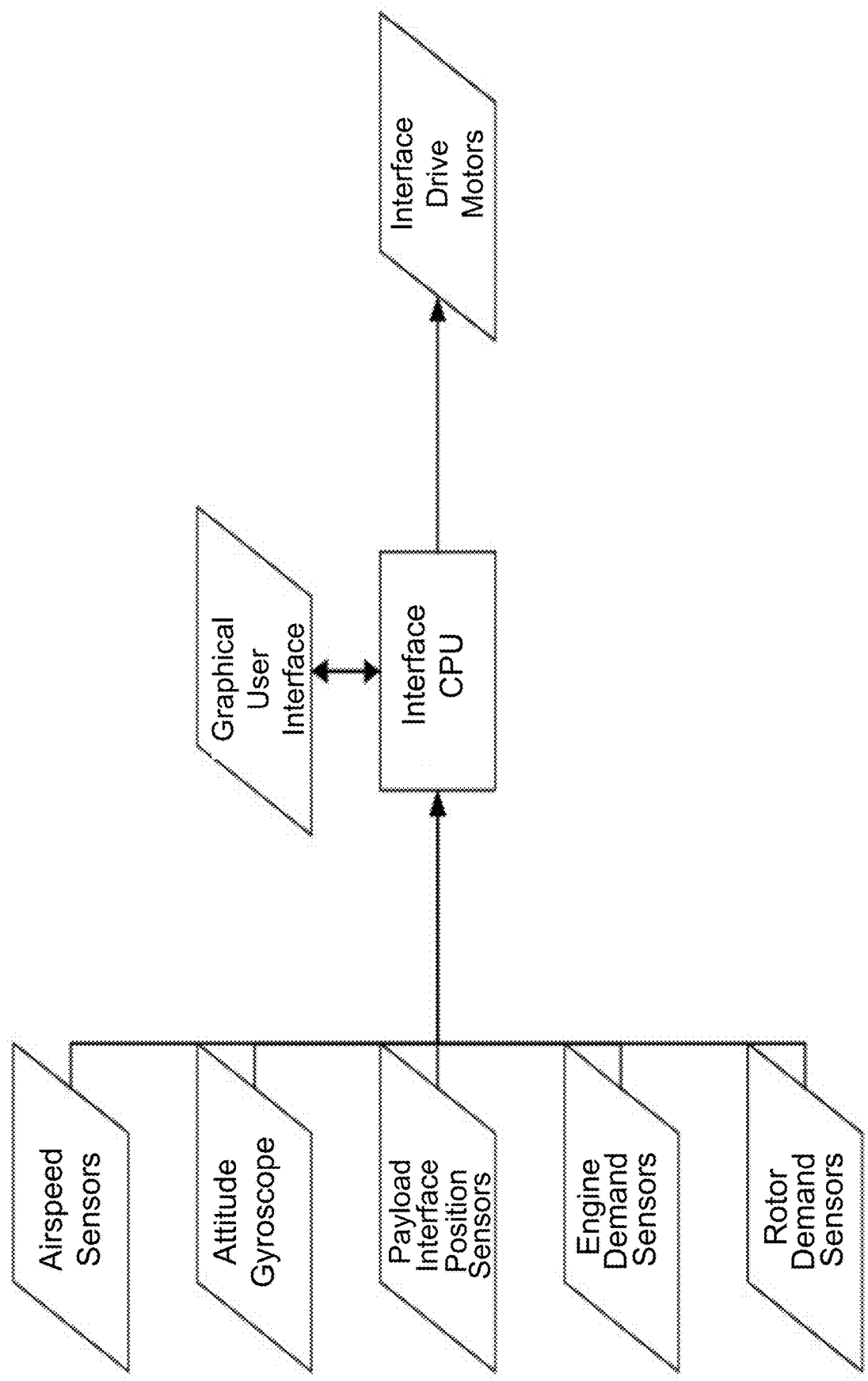
FIG. 7 is a block diagram of a method, according to an example.

FIG. 7 is an illustration of a simplified network diagram depicting the relationship between sensors, their signals, the central processing unit, and the mechanical interface of the method and system of this disclosure.

Referring to FIG. 5, a generic quad-copter drone aircraft is depicted in lateral profile view with a payload container hardmounted to the underside via the dynamic mechanical interface. The payload container's position is centered underneath the aircraft. The payload's center of gravity is shifted to the left-hand side as depicted due to the payload mass being unevenly distributed within the container. The aircraft's own center of gravity is centered between the rotor systems, as designed. This misalignment of the two centers of gravity creates the tendency for the aircraft to experience an excessive downward force on the lefthand side as the two centers of gravity naturally seek alignment while in flight. To maintain a level flight attitude, the rotor systems of the quadcopter are subjected to asymmetric load demands. The left two (one superimposed over the other in this view) experience additional power demand to maintain attitude which in turn reduces the power margins available for flight control. In extreme cases, the demand may even exceed the available power margin which would be described as an out-of-CG emergency condition that results in a crash if unresolved. The rotor systems on the right-hand side however experience reduced demand and abnormally high power margins because the combined CGs of the aircraft and payload are further than normal for the arm of the rotor systems.

Element 52 depicts a low power margin.
Element 53 depicts a power capacity.
Element 54 depicts a power demand.
Element 56 depicts an aircraft center of gravity.
Element 58 depicts a payload.
Element 60 depicts a payload center of gravity.
Element 62 depicts a power capacity.
Element 63 depicts a high power margin.
Element 64 depicts a power plant/rotor system.
Element 66 depicts an airframe.
Element 68 depicts a dynamic interface.
Element 70 depicts a payload container.
Element 72 depicts a payload imbalance pulling the aircraft out of level attitude to misalign centers of gravity.

FIG. 6 represents the intervention made possible by the method and system of the disclosure. Here, a generic quadcopter drone aircraft is depicted in lateral profile view with a payload container hard-mounted to the underside via the dynamic mechanical interface. The payload container's position is shifted to the right, underneath the aircraft. As a result, the payload's CG is aligned, and the combined CG is directly underneath the aircraft CG. The payload container's CG is shifted to the left-hand side as depicted due to the payload mass being unevenly distributed within the container. The aircraft's own center of gravity is centered between the rotor systems, as designed. In shifting the payload to the right, relative to the aircraft via the dynamic mechanical interface, the payload and combined CG are moved directly underneath the aircraft's CG. In this arrangement, the downward pressure on the left-hand side depicted in FIG. 5 has been corrected and the tendency is for the aircraft to return to a level, balanced attitude with even load demands spread across all rotor systems. This condition equalizes the load demands to maintain maximum power margins and flight controllability.

Element 74 depicts a balanced power margin.
Element 76 depicts a power demand.
Element 78 depicts a margin power capacity.
Element 80 depicts an aircraft center of gravity.
Element 82 depicts a payload.
Element 84 depicts a payload center of gravity.
Element 86 depicts a balanced power margin.
Element 88 depicts a power capacity.
Element 90 depicts a power plant/rotor system.
Element 92 depicts a dynamic interface
Element 94 depicts the dynamic interface adjusting the position of the payload to align centers of gravity and balance power demand across power plant capacities to maximize power margins.
Element 96 depicts the adjusted dynamic interface position neutralizing the pull of the payload center of gravity imbalance to maintain a level attitude.

In FIG. 7, a schematic diagram depicts the relationship between the various components of the system. The Payload Interface Central Processing Unit receives data signals from various sensors installed throughout the aircraft to determine how the combined centers of gravity are affecting flight characteristics and to compute corrections to maximize flight control, stability, safety, etc. It does this by monitoring engine and rotor demand signals and comparing them to the desired state. Using this data, coupled with airspeed, attitude, and payload position information, the central processing unit sends a command signal to the Interface Drive Motors to adjust the payload's undermounted position in relation to the aircraft. This information and control are managed via a Graphical User Interface and changes can therefore be manually directed, or automatically.

This disclosure provides a means to dynamically control demand loads placed upon critical systems that are influenced by centers of gravity by changing the relative positions of an aircraft's CG and that of its cargo payload. While the present disclosure has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the spirit of this disclosure.

EXAMPLE EMBODIMENTS (EES)

Example Embodiment 1 (EE 1) is an apparatus comprising: a mechanical interface configured to couple an object to a frame of an aircraft; one or more processors; and a computer readable medium storing instructions that, when executed by the one or more processors, cause the apparatus to perform functions comprising: detecting a control input provided to an actuator of the aircraft and/or an output of a sensor that indicates a state of the actuator; determining, based on the control input provided to the actuator and/or the output of the sensor, a procedure for moving the object relative to the frame; and using the mechanical interface to perform the procedure.

EE 2 is the apparatus of EE 1, wherein the actuator comprises rotor blades, a turbofan, a turbine, a ducted fan, a rudder, or an elevator.

EE 3 is the apparatus of any one of EEs 1-2, wherein the sensor comprises one or more of a position sensor, a temperature sensor, a torque sensor, or a tachometer.

EE 4 is the apparatus of any one of EEs 1-3, wherein the mechanical interface is configured to move the object in two orthogonal directions with respect to the frame.

EE 5 is the apparatus of any one of EEs 1-4, wherein the object comprises (a) a battery configured to provide power to the aircraft, (b) a cargo container, (c) the one or more processors, (d) the computer readable medium, (e) a camera, or (f) a container of fluid.

EE 6 is the apparatus of any one of EEs 1-5, wherein determining the procedure comprises determining the procedure based on the output of the sensor.

EE 7 is the apparatus of any one of EEs 1-6, the functions further comprising determining that the output satisfies a condition, wherein determining the procedure comprises determining the procedure in response to determining that the output satisfies the condition.

EE 8 is the apparatus of EE 7, wherein determining that the output satisfies the condition comprises determining that a temperature of the actuator exceeds a threshold temperature.

EE 9 is the apparatus of EE 8, wherein the actuator is a first actuator and the aircraft further comprises a second actuator, wherein determining the procedure comprises determining the procedure such that the procedure includes moving the object away from the first actuator and/or toward the second actuator.

EE 10 is the apparatus of EE 7, wherein determining that the output satisfies the condition comprises determining that an angular velocity of the actuator exceeds a threshold angular velocity.

EE 11 is the apparatus of EE 10, wherein the actuator is a first actuator and the aircraft further comprises a second actuator, wherein determining the procedure comprises determining the procedure such that the procedure includes moving the object away from the first actuator and/or toward the second actuator.

EE 12 is the apparatus of EE 7, wherein determining that the output satisfies the condition comprises determining that a torque output of the actuator exceeds a threshold torque output.

EE 13 is the apparatus of EE 12, wherein the actuator is a first actuator and the aircraft further comprises a second actuator, wherein determining the procedure comprises determining the procedure such that the procedure includes moving the object away from the first actuator and/or toward the second actuator.

EE 14 is the apparatus of EE 7, wherein determining that the output satisfies the condition comprises determining that a position of the actuator exceeds a threshold position or that an orientation of the actuator exceeds a threshold orientation.

EE 15 is the apparatus of EE 7, wherein the actuator is a first actuator and the aircraft further comprises a second actuator, wherein determining that the output satisfies the condition comprises determining that a difference between (i) the output associated with the first actuator and (ii) a second output associated with the second actuator exceeds a threshold.

EE 16 is the apparatus of EE 15, wherein determining that the difference exceeds the threshold comprises determining that a first angular velocity of the first actuator exceeds a second angular velocity of the second actuator by more than the threshold.

EE 17 is the apparatus of EE 15, wherein determining that the difference exceeds the threshold comprises determining that a first temperature of the first actuator exceeds a second temperature of the second actuator by more than the threshold.

EE 18 is the apparatus of EE 15, wherein determining that the difference exceeds the threshold comprises determining that a first torque output of the first actuator exceeds a second torque output of the second actuator by more than the threshold.

EE 19 is the apparatus of EE 15, wherein determining that the difference exceeds the threshold comprises determining that a first position of the first actuator differs from a second position of the second actuator by more than the threshold.

EE 20 is the apparatus of any one of EEs 1-19, wherein the control input comprises a command to change a thrust provided by the actuator, a blade pitch of the actuator, or a position of the actuator.

EE 21 is the apparatus of any one of EEs 1-20, wherein determining the procedure comprises determining the procedure based on the control input provided to the actuator.

EE 22 is the apparatus of EE 21, wherein detecting the control input comprises detecting a command to pitch a first end of the aircraft downward to move the aircraft toward the first end, and wherein determining the procedure comprises determining the procedure such that the procedure includes moving the object toward a second end of the aircraft that is opposite the first end.

EE 23 is the apparatus of EE 21, wherein the actuator is a first actuator and the aircraft further comprises a second actuator, wherein detecting the control input comprises detecting a command that if executed would cause the first actuator to exceed a threshold condition, and wherein determining the procedure comprises determining the procedure such that the procedure includes moving the object away from the first actuator and/or toward the second actuator.

EE 24 is a non-transitory computer readable medium storing instructions that, when executed by one or more processors of an apparatus, cause the apparatus to perform functions comprising: detecting a control input provided to an actuator of an aircraft and/or an output of a sensor that indicates a state of the actuator; determining, based on the control input provided to the actuator and/or the output of the sensor, a procedure for moving an object relative to a frame of the aircraft; and using a mechanical interface to perform the procedure.

EE 25 is the non-transitory computer readable medium of EE 24, wherein the actuator comprises rotor blades, a turbofan, a turbine, or a ducted fan.

EE 26 is the non-transitory computer readable medium of any one of EEs 24-25, wherein the sensor comprises one or more of a position sensor, a temperature sensor, a torque sensor, or a tachometer.

EE 27 is the non-transitory computer readable medium of any one of EEs 24-26, wherein the mechanical interface is configured to move the object in two orthogonal directions with respect to the frame.

EE 28 is the non-transitory computer readable medium of any one of EEs 24-27, wherein the object comprises (a) a battery configured to provide power to the aircraft, (b) a cargo container, (c) the one or more processors, (d) the computer readable medium, (e) a camera, or (f) a container of fluid.

EE 29 is the non-transitory computer readable medium of any one of EEs 24-28, wherein determining the procedure comprises determining the procedure based on the output of the sensor.

EE 30 is the non-transitory computer readable medium of any one of EEs 24-29, the functions further comprising determining that the output satisfies a condition, wherein determining the procedure comprises determining the procedure in response to determining that the output satisfies the condition.

EE 31 is the non-transitory computer readable medium of EE 30, wherein determining that the output satisfies the condition comprises determining that a temperature of the actuator exceeds a threshold temperature.

EE 32 is the non-transitory computer readable medium of EE 31, wherein the actuator is a first actuator and the aircraft further comprises a second actuator, wherein determining the procedure comprises determining the procedure such that the procedure includes moving the object away from the first actuator and/or toward the second actuator.

EE 33 is the non-transitory computer readable medium of EE 30, wherein determining that the output satisfies the condition comprises determining that an angular velocity of the actuator exceeds a threshold angular velocity.

EE 34 is the non-transitory computer readable medium of EE 33, wherein the actuator is a first actuator and the aircraft further comprises a second actuator, wherein determining the procedure comprises determining the procedure such that the procedure includes moving the object away from the first actuator and/or toward the second actuator.

EE 35 is the non-transitory computer readable medium of EE 30, wherein determining that the output satisfies the condition comprises determining that a torque output of the actuator exceeds a threshold torque output.

EE 36 is the non-transitory computer readable medium of EE 35, wherein the actuator is a first actuator and the aircraft further comprises a second actuator, wherein determining the procedure comprises determining the procedure such that the procedure includes moving the object away from the first actuator and/or toward the second actuator.

EE 37 is the non-transitory computer readable medium of EE 30, wherein determining that the output satisfies the condition comprises determining that a position of the actuator exceeds a threshold position or that an orientation of the actuator exceeds a threshold orientation.

EE 38 is the non-transitory computer readable medium of EE 37, wherein the actuator is a first actuator and the aircraft further comprises a second actuator, wherein determining that the output satisfies the condition comprises determining that a difference between (i) the output associated with the first actuator and (ii) a second output associated with the second actuator exceeds a threshold.

EE 39 is the non-transitory computer readable medium of EE 38, wherein determining that the difference exceeds the threshold comprises determining that a first angular velocity of the first actuator exceeds a second angular velocity of the second actuator by more than the threshold.

EE 40 is the non-transitory computer readable medium of EE 38, wherein determining that the difference exceeds the threshold comprises determining that a first temperature of the first actuator exceeds a second temperature of the second actuator by more than the threshold.

EE 41 is the non-transitory computer readable medium of EE 38, wherein determining that the difference exceeds the threshold comprises determining that a first torque output of the first actuator exceeds a second torque output of the second actuator by more than the threshold.

EE 42 is the non-transitory computer readable medium of EE 38, wherein determining that the difference exceeds the threshold comprises determining that a first position of the first actuator differs from a second position of the second actuator by more than the threshold.

EE 43 is the non-transitory computer readable medium of any one of EEs 24-2, wherein the control input comprises a command to change a thrust provided by the actuator, a blade pitch of the actuator, or a position of the actuator.

EE 44 is the non-transitory computer readable medium of any one of EEs 24-43, wherein determining the procedure comprises determining the procedure based on the control input provided to the actuator.

EE 45 is the non-transitory computer readable medium of EE 44, wherein detecting the control input comprises detecting a command to pitch a first end of the aircraft downward to move the aircraft toward the first end, and wherein determining the procedure comprises determining the procedure such that the procedure includes moving the object toward a second end of the aircraft that is opposite the first end.

EE 46 is the non-transitory computer readable medium of EE 44, wherein the actuator is a first actuator and the aircraft further comprises a second actuator, wherein detecting the control input comprises detecting a command that if executed would cause the first actuator to exceed a threshold condition, and wherein determining the procedure comprises determining the procedure such that the procedure includes moving the object away from the first actuator and/or toward the second actuator.

EE 47 is a method comprising: detecting a control input provided to an actuator of an aircraft and/or an output of a sensor that indicates a state of the actuator; determining, based on the control input provided to the actuator and/or the output of the sensor, a procedure for moving an object relative to a frame of the aircraft; and using a mechanical interface to perform the procedure.

EE 48 is the method of EE 47, wherein the actuator comprises rotor blades, a turbofan, a turbine, or a ducted fan.

EE 49 is the method of any one of EEs 47-48, wherein the sensor comprises one or more of a position sensor, a temperature sensor, a torque sensor, or a tachometer.

EE 50 is the method of any one of EEs 47-49, wherein the mechanical interface is configured to move the object in two orthogonal directions with respect to the frame.

EE 51 is the method of any one of EEs 47-50, wherein the object comprises (a) a battery configured to provide power to the aircraft, (b) a cargo container, (c) the one or more processors, (d) the computer readable medium, (e) a camera, or (f) a container of fluid.

EE 52 is the method of any one of EEs 47-51, wherein determining the procedure comprises determining the procedure based on the output of the sensor.

EE 53 is the method of any one of EEs 47-53, further comprising determining that the output satisfies a condition, wherein determining the procedure comprises determining the procedure in response to determining that the output satisfies the condition.

EE 54 is the method of EE 53, wherein determining that the output satisfies the condition comprises determining that a temperature of the actuator exceeds a threshold temperature.

EE 55 is the method of EE 54, wherein the actuator is a first actuator and the aircraft further comprises a second actuator, wherein determining the procedure comprises determining the procedure such that the procedure includes moving the object away from the first actuator and/or toward the second actuator.

EE 56 is the method of EE 53, wherein determining that the output satisfies the condition comprises determining that an angular velocity of the actuator exceeds a threshold angular velocity.

EE 57 is the method of EE 56, wherein the actuator is a first actuator and the aircraft further comprises a second actuator, wherein determining the procedure comprises determining the procedure such that the procedure includes moving the object away from the first actuator and/or toward the second actuator.

EE 58 is the method of EE 53, wherein determining that the output satisfies the condition comprises determining that a torque output of the actuator exceeds a threshold torque output.

EE 59 is the method of EE 58, wherein the actuator is a first actuator and the aircraft further comprises a second actuator, wherein determining the procedure comprises determining the procedure such that the procedure includes moving the object away from the first actuator and/or toward the second actuator.

EE 60 is the method of EE 53, wherein determining that the output satisfies the condition comprises determining that a position of the actuator exceeds a threshold position or that an orientation of the actuator exceeds a threshold orientation.

EE 61 is the method of EE 53, wherein the actuator is a first actuator and the aircraft further comprises a second actuator, wherein determining that the output satisfies the condition comprises determining that a difference between (i) the output associated with the first actuator and (ii) a second output associated with the second actuator exceeds a threshold.

EE 62 is the method of EE 61, wherein determining that the difference exceeds the threshold comprises determining that a first angular velocity of the first actuator exceeds a second angular velocity of the second actuator by more than the threshold.

EE 63 is the method of EE 61, wherein determining that the difference exceeds the threshold comprises determining that a first temperature of the first actuator exceeds a second temperature of the second actuator by more than the threshold.

EE 64 is the method of EE 61, wherein determining that the difference exceeds the threshold comprises determining that a first torque output of the first actuator exceeds a second torque output of the second actuator by more than the threshold.

EE 65 is the method of EE 61, wherein determining that the difference exceeds the threshold comprises determining that a first position of the first actuator differs from a second position of the second actuator by more than the threshold.

EE 66 is the method of any one of EEs 47-65, wherein the control input comprises a command to change a thrust provided by the actuator, a blade pitch of the actuator, or a position of the actuator.

EE 67 is the method of any one of EEs 47-66, wherein determining the procedure comprises determining the procedure based on the control input provided to the actuator.

EE 68 is the method of EE 67, wherein detecting the control input comprises detecting a command to pitch a first end of the aircraft downward to move the aircraft toward the first end, and wherein determining the procedure comprises determining the procedure such that the procedure includes moving the object toward a second end of the aircraft that is opposite the first end.

EE 69 is the method of EE 67, wherein the actuator is a first actuator and the aircraft further comprises a second actuator, wherein detecting the control input comprises detecting a command that if executed would cause the first actuator to exceed a threshold condition, and wherein determining the procedure comprises determining the procedure such that the procedure includes moving the object away from the first actuator and/or toward the second actuator.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

The invention claimed is:

1. An apparatus comprising:
    a mechanical interface configured to couple an object to a frame of an aircraft;
    one or more processors; and
    a computer readable medium storing instructions that, when executed by the one or more processors, cause the apparatus to perform functions comprising:
        detecting a control input provided to an actuator of the aircraft, wherein the control input comprises a command to change (i) a thrust provided by the actuator, (ii) a blade pitch of the actuator, or (iii) a position of the actuator;
        determining a procedure for moving the object relative to the frame based on the control input provided to the actuator; and
        using the mechanical interface to perform the procedure before the thrust, the blade pitch, or the position is changed according to the command.

2. The apparatus of claim 1, the functions further comprising:
    detecting an output of a sensor that indicates a state of the actuator,
    wherein determining the procedure comprises determining the procedure in response to determining that the output of the sensor satisfies a condition.

3. The apparatus of claim 2, wherein determining that the output satisfies the condition comprises determining that a temperature of the actuator exceeds a threshold temperature.

4. The apparatus of claim 3, wherein the actuator is a first actuator and the aircraft further comprises a second actuator, wherein determining the procedure comprises determining the procedure such that the procedure includes moving the object away from the first actuator and toward the second actuator.

5. The apparatus of claim 2, wherein determining that the output satisfies the condition comprises determining that an angular velocity of the actuator exceeds a threshold angular velocity.

6. The apparatus of claim 5, wherein the actuator is a first actuator and the aircraft further comprises a second actuator, wherein determining the procedure comprises determining the procedure such that the procedure includes moving the object away from the first actuator and toward the second actuator.

7. The apparatus of claim 2, wherein determining that the output satisfies the condition comprises determining that a torque output of the actuator exceeds a threshold torque output.

8. The apparatus of claim 7, wherein the actuator is a first actuator and the aircraft further comprises a second actuator, wherein determining the procedure comprises determining the procedure such that the procedure includes moving the object away from the first actuator and toward the second actuator.

9. The apparatus of claim 2, wherein determining that the output satisfies the condition comprises determining that the position of the actuator exceeds a threshold position.

10. The apparatus of claim 2, wherein the actuator is a first actuator and the aircraft further comprises a second actuator, wherein determining that the output satisfies the condition comprises determining that a difference between (i) the output associated with the first actuator and (ii) a second output associated with the second actuator exceeds a threshold.

11. The apparatus of claim 10, wherein determining that the difference exceeds the threshold comprises determining that a first angular velocity of the first actuator exceeds a second angular velocity of the second actuator by more than the threshold.

12. The apparatus of claim 10, wherein determining that the difference exceeds the threshold comprises determining that a first temperature of the first actuator exceeds a second temperature of the second actuator by more than the threshold.

13. The apparatus of claim 10, wherein determining that the difference exceeds the threshold comprises determining that a first torque output of the first actuator exceeds a second torque output of the second actuator by more than the threshold.

14. The apparatus of claim 10, wherein determining that the difference exceeds the threshold comprises determining that a first position of the first actuator differs from a second position of the second actuator by more than the threshold.

15. The apparatus of claim 1, wherein detecting the control input comprises detecting the command to pitch a first end of the aircraft downward to move the aircraft toward the first end, and wherein determining the procedure comprises determining the procedure such that the procedure includes moving the object toward a second end of the aircraft that is opposite the first end.

16. The apparatus of claim 1, wherein the actuator is a first actuator and the aircraft further comprises a second actuator, wherein detecting the control input comprises detecting the command that if executed would cause the first actuator to exceed a threshold condition, and wherein determining the procedure comprises determining the procedure such that the procedure includes moving the object away from the first actuator and/or toward the second actuator.

17. A non-transitory computer readable medium storing instructions that, when executed by one or more processors of an apparatus, cause the apparatus to perform functions comprising:
  detecting a control input provided to an actuator of an aircraft, wherein the control input comprises a command to change (i) a thrust provided by the actuator, (ii) a blade pitch of the actuator, or (iii) a position of the actuator;
  determining a procedure for moving an object relative to a frame of the aircraft based on the control input provided to the actuator; and
  using a mechanical interface to perform the procedure before the thrust, the blade pitch, or the position is changed according to the command.

18. A method comprising:
  detecting a control input provided to an actuator of an aircraft, wherein the control input comprises a command to change (i) a thrust provided by the actuator, (ii) a blade pitch of the actuator, or (iii) a position of the actuator;
  determining a procedure for moving an object relative to a frame of the aircraft based on the control input provided to the actuator; and
  using a mechanical interface to perform the procedure before the thrust, the blade pitch, or the position is changed according to the command.

* * * * *